Oct. 3, 1961   R. C. BODEM ET AL   3,002,568
VARIABLE PITCH PROPELLER ASSEMBLY FOR
MULTI-POWER PLANT AIRCRAFT
Original Filed March 19, 1956   5 Sheets-Sheet 1

INVENTORS
Roy C. Bodem
Roy H. Brandes
Richard A. Hirsch
Edward H. McDonald
Carl F. Wood
BY
G. H. Strickland
Their Attorney

Fig. 3.

3,002,568
VARIABLE PITCH PROPELLER ASSEMBLY FOR MULTI-POWER PLANT AIRCRAFT
Roy C. Bodem and Roy H. Brandes, Dayton, and Richard A. Hirsch, West Milton, Edward H. McDonald, Tipp City, and Carl F. Wood, Dayton, Ohio, assignors to General Motors Corporation, Detroit, Mich., a corporation of Delaware
Original application Mar. 19, 1956, Ser. No. 572,348. Divided and this application Aug. 13, 1959, Ser. No. 840,484
11 Claims. (Cl. 170—160.21)

This invention pertains to variable pitch propellers, and particularly to a variable pitch propeller assembly designed for use with gas turbine powered aircraft. This application is a division of Serial No. 572,348, filed March 19, 1956.

One of the essential requirements of presently available commercial gas turbine propeller plants is that of substantially constant speed operation. Thus, a variable pitch propeller assembly driven by a turbine must include an isochronous governor of high sensitivity for controlling propeller pitch to maintain turbine speed substantially constant during normal flight operation. Preferably, the propeller assembly includes hydraulically actuated motor means for varying propeller pitch and during constant speed operation, propeller pitch is controlled by a hydraulic governor. The hydraulic governor is calibrated to maintain a selected speed of propeller rotation, and, hence, a selected speed of turbine rotation, and the speed setting of the governor cannot be manually adjusted by the pilot during normal aircraft flight operation. However, in a multi-power plant aircraft, it is necessary to have the several turbine-propeller combinations operate at a synchronous speed, and to accomplish this result, mechanism can be incorporated for synchronizing the speed of "slave" turbine propeller combinations with a "master" turbine propeller combination. The speed synchronizing mechanism, per se, forms no part of this invention, but may be of the general type wherein the speed synchronizing mechanism can automatically adjust the hydraulic governors of the slave turbine propeller combinations which deviate from the speed of the master combination within a limited range by electromotive means. In addition, it is desirable to phase synchronize the propellers to maintain a predetermined phase relationship between the master propeller and the slave propellers. The phase synchronizing mechanism, per se, likewise, constitutes no part of this invention but may comprise an electrical unit for actuating solenoid valves connected in parallel with the hydraulic governors of the "slave" propellers.

Moreover, the propeller assemblies of a multiturbine powered aircraft preferably include safety feathering means for increasing the pitch of a propeller driven by a failing turbine during normal propeller operation. The safety feathering means are of the "uncommitted" type wherein the pitch position of the propeller driven by a failing turbine is increased to reduce the drag on the aircraft, but which does not automatically completely feather the propeller so that in the event that the failing turbine should recover, control of propeller pitch will be automatically returned to the hydraulic governor, thereby enabling this propeller-turbine combination to again assist in propelling the aircraft. The failure of a power plant may be detected by sensing negative propeller shaft torque. It is also advantageous to incorporate automatic "committed" feathering means in the propeller assemblies for a multi-power plant aircraft, which feathering means are only operative during take-off of the aircraft when the power lever is in the take-off position, and, in addition, are automatically disarmed upon a failure of one power plant. Thus, during take-off, the propeller of a failing power plant is automatically moved to the feathered position so as to reduce the drag of the inoperative power plant to a minimum during take-off. The failure of a power plant during take-off may be detected by sensing negative propeller shaft thrust. In addition, each propeller assembly for a plural power plant aircraft should include emergency feathering means and normal feathering means.

Since a variable pitch propeller can be adjusted to develop positive thrust, negative thrust and also be adjusted to a pitch position wherein it imposes a minimum load on the power plant, i.e. a substantially flat pitch, or start angle, where a minimum thrust is developed, it is desirable to include means for manually selecting blade angles, or pitch positions, as well as means for adjusting the propeller blades to the full reverse position. These advantages of a variable pitch propeller increase the maneuverability and flexibility of ground operation of an aircraft. However, in order to realize the full benefits of a variable pitch propeller which includes safety feathering means actuated by a negative propeller shaft torque sensing device, means must be incorporated in the propeller assembly for disabling, or blocking out, the safety feathering means during propeller operation in the regime of manually selected blade angles. The disabling means for the safety feathering means must be incorporated since when the aircraft is making the approach for a landing with the propeller blades at the minimum flight low pitch position, under some conditions negative propeller shaft torque will be developed when the propeller blades are moved from this low positive pitch position through flat pitch and into the negative thrust range. Hence, if disabling means for the safety feathering means were not incorporated, the pilot would be unable to manually select a blade angle in the negative thrust range.

Inasmuch as it is well recognized that the failure of a turbine during take-off of a multi-power plant aircraft may result in a mishap, the multi-power plant aircraft includes automatic feathering means, as aforementioned. However, the automatic feathering means may not detect an incipient turbine failure, so that it is desirable to manually schedule a propeller pitch position only slightly below the pitch position required for normal governing during take-off so as to reduce the drag created by a failing engine. In other words, it is highly advantageous to schedule a blade angle above the flight idle angle, or low pitch stop position, during take-off since if the pitch angle is higher during take-off, the failure of a turbine will not result in the magnitude of drag that would occur if the blades were at the low pitch stop position. In addition, the beta follow-up system will always reduce, and usually prevent propeller overspeeding during take-off which might be caused by a governor malfunction. However, as soon as the take-off operation is completed and the power lever is moved to an intermediate position in the cruise range, it is desirable to reduce the minimum flight low pitch stop position to the minimum safe low flight angle. The present invention relates to a variable pitch propeller assembly including all of the desirable features hereinbefore alluded to.

Accordingly, among our objects are the provision of a variable pitch propeller assembly including means for scheduling a minimum blade angle during take-off, which is higher than the minimum safe low flight angle; the further provision of propeller assembly including hydraulic means for adjusting the pitch thereof and a manually variable hydraulic low pitch stop therefore; and the further provision of a propeller assembly of the aforesaid type including nonrotatable control means which extend into the rotatable reservoir structure for controlling operation of valve assemblies contained therein.

The aforementioned and other objects are accomplished in the present invention by designing the propeller assembly so that all of the manually adjustable primary control valves are actuated mechanically through linkages from a stationary adapter assembly. Specifically, the propeller assembly includes a hub, which is adapted for connection to the propeller shaft of a turbine. The hub is formed with a plurality of radially extending sockets within which propeller blades are journaled for rotation about their longitudinal axes throughout a range of pitch positions from full reverse to a feathered position. The propeller assembly is generally similar to that disclosed in copending applications Serial No. 485,921, Ditmer, et al., now Patent No. 2,891,627, and Serial No. 485,922, Brandes, et al., now Patent No. 2,919,752, both filed February 3, 1955, and assigned to the assignee of this invention.

Accordingly, the pitch position of each propeller blade is controlled by a fluid pressure actuated torque unit assembled into each hub socket and enclosed by the hollow root portion of its respective propeller blade. Each torque unit includes a cylinder which rotates upon reciprocable movement of a piston disposed therein, each cylinder being connected to its respective blade through an indexing ring. The pitch positions of the several propeller blades in the hub are coordinated by a master gear which meshes with gear segments formed on the torque unit cylinders, the master gear being journaled in the hub for rotation about the horizontal propeller axis.

A rotating reservoir assembly, or regulator, is attached to the rear of the propeller hub. The regulator assembly contains a quantity of oil for the self-contained hydraulic system and includes a housing, a cover, a slip ring assembly, valve assemblies which rotate with the propeller about a stationary adapter assembly and accessory plate. A plurality of pumps are mounted on the regulator housing, these pumps being energized incident to propeller rotation about the stationary adapter assembly which includes a pump power gear. All of the control valve assemblies are mounted on the regulator housing, and the hydraulic connections between the valve assemblies and the torque units are formed by tubes and passages formed as an integral part of the regulator housing and the propeller hub. In addition, the major control valves are integrated into unitary valve assemblies which are removable through access openings in the regulator cover. The access openings are closed by plates removably attached to the regulator cover.

The stationary adapter assembly includes, in addition to the pump power gear, a synchronizing lever, a feathering lever, and a control lever. Each lever is connected to a ring gear which effects rotation of a plurality of pinion gears attached to high lead screws. The high lead screws, rotated by each of the three levers, threadedly engage separate axially movable rings disposed within the regulator and slidable on an adapter sleeve, i.e. a control ring, a feathering ring and a speed ring. The control ring of the adapter assembly is operatively connected with the governor valve asesmbly, as well as the feathering valve assembly. The feathering ring is operatively connected to the feathering valve assembly and the speed ring is connected to the speed adjusting means of the governor valve assembly.

A feathering pump and reservoir assembly is attached to the front of the propeller hub and contains an electric motor, a pump drivingly connected to the motor, an oil filler attachment, a feathering pump control valve assembly and a separate reservoir of oil independent of the regulator reservoir. The feathering pump reservoir is air cooled and contains sufficient oil for completely feathering the propeller at all times.

In addition, the propeller assembly includes a mechanical low pitch stop assembly and a mechanical pitch lock assembly, which may be of the type disclosed in copending applications Serial No. 545,033, now abandoned, and Serial No. 545,034, Flaugh, et al., now Patent No. 2,957,528, both filed on November 4, 1955, and assigned to the assignee of this invention.

Further objects and advantages of the present invention will be apparent from the following description, reference being had to the accompanying drawings wherein preferred embodiments of the present invention are clearly shown.

Figures 1, 2:
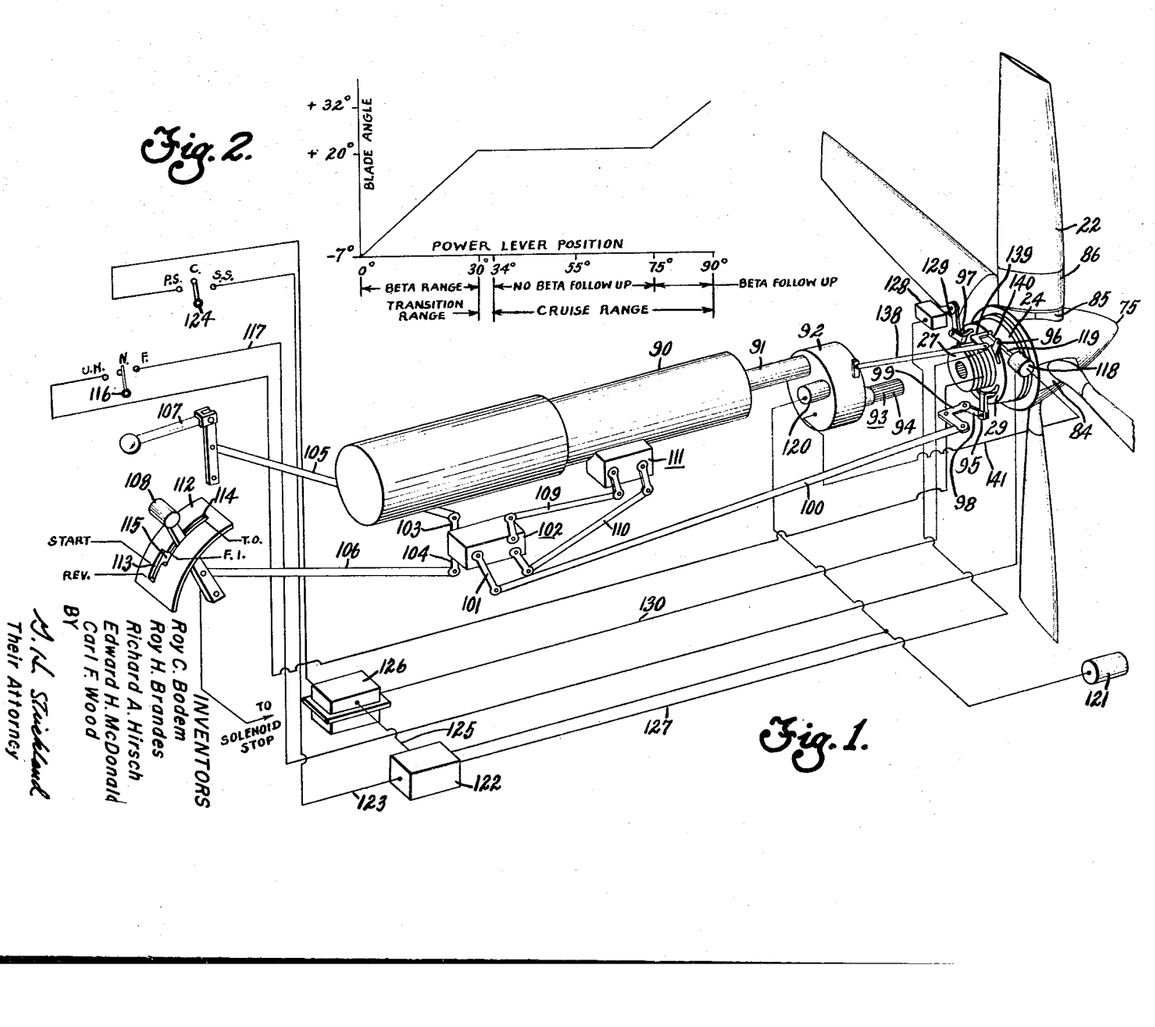
FIGURE 1 is a schematic view of a turbine-propeller combination illustrating the propeller control system.
FIGURE 2 is a graph depicting blade angles that can be manually scheduled by movement of the power lever.
Figure 6:
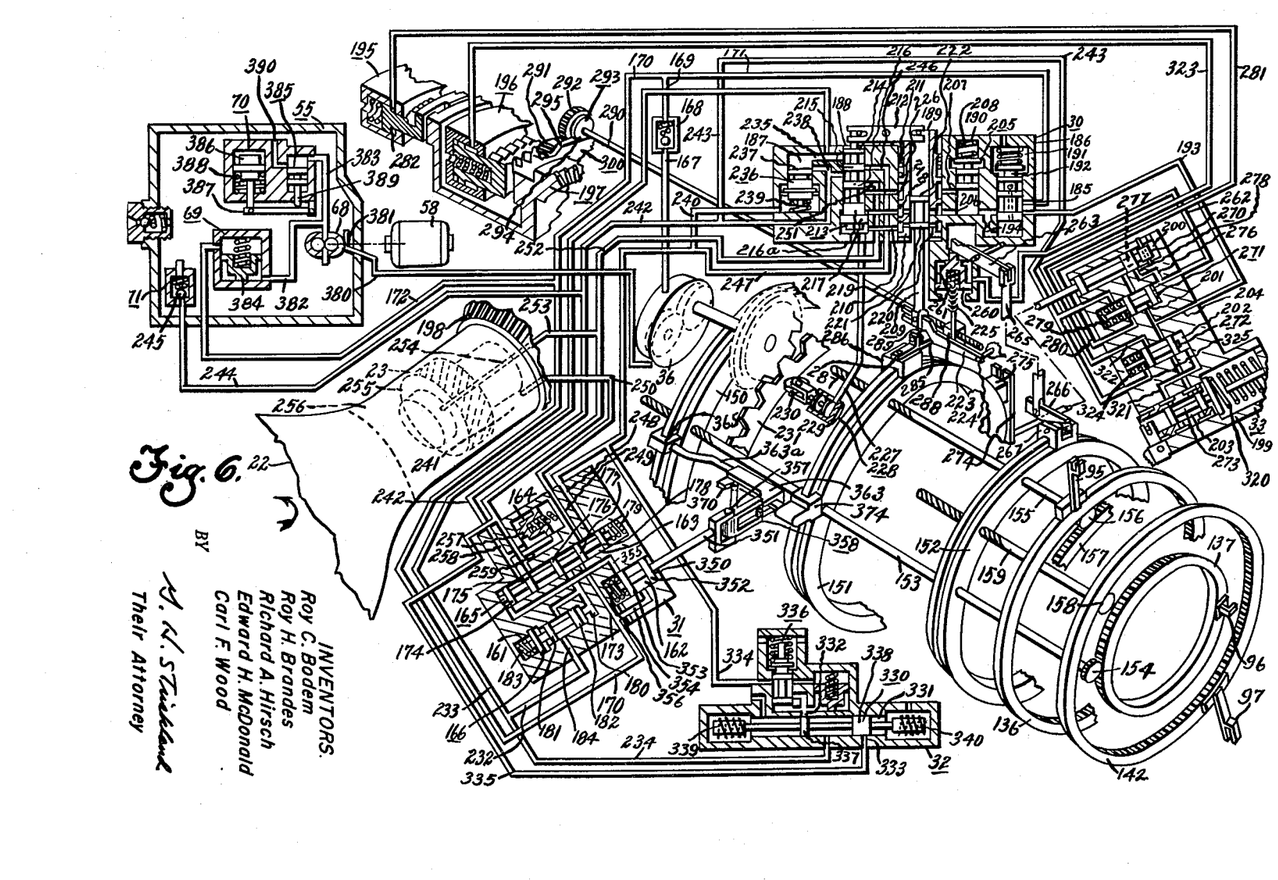
FIGURE 6 is a view, partly schematic and partly structural, of the propeller hydraulic control system, together with the blade torque unit, hub, and regulator assembly.

With particular reference to FIG. 1, a propeller assembly is shown including a hub having a plurality of radially extending sockets within which propeller blades 22 are journaled for rotation about their longitudinal axes throughout a range of pitch positions from full reverse to full feather. Each propeller blade 22 encloses its own torque unit 23, as shown in FIG. 6, which is assembled into its respective hub socket, the torque units being of the general type disclosed in aforementioned copending application Serial No. 485,921, now Patent No. 2,891,627. The hub is formed with a manifold, or passage means, for conveying hydraulic fluid under pressure from a regulator assembly 24 to opposite sides of the torque units mounted in the hub sockets so as to move the blades 22 in either an increase pitch direction or a decrease pitch direction.

Figure 3:
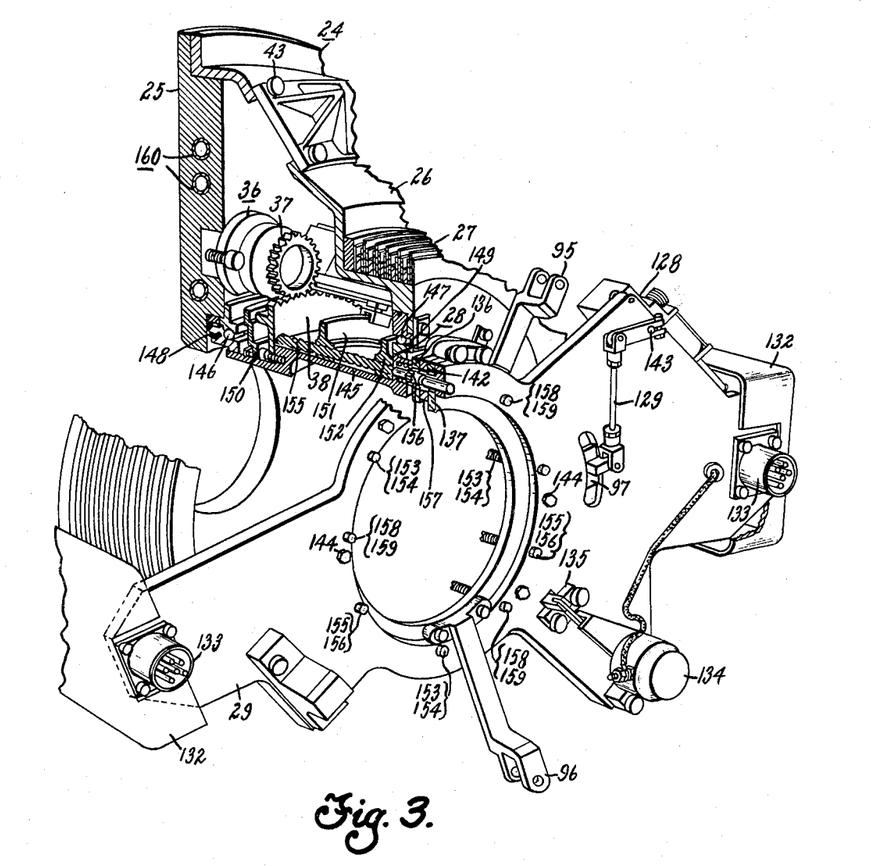
FIGURE 3 is an isometric view, partly in section and partly in elevation, of the regulator assembly including the stationary adaptor assembly and accessory plate.

With reference to FIG. 3, the regulator assembly includes a housing 25 attached to the rear of the propeller hub so as to rotate therewith, a cover 26 attached to the housing 25 having slip rings 27 thereon, a stationary adapter assembly 28, a portion of which is enclosed by the cover 26 and a stationary accessory plate 29, which is connected to the adapter assembly. Bearing means are incorporated for journaling the regulator housing and cover about the stationary adapter assembly, and the housing, cover and stationary adapter assembly form a doughnut shaped reservoir structure containing hydraulic fluid. In order to prevent the leakage of hydraulic fluid from the reservoir structure, suitable sealing means are disposed between the adapter assembly and the rotatable components of the regulator assembly.

With particular reference to FIG. 1, a typical aircraft power plant including the propeller assembly of this invention is shown in schematic form. The power plant includes a gas turbine 90, the output shaft 91 of which is connected through a gear reduction unit 92 to a propeller shaft 93 having splines 94 adapted to mate with complementary splines on the propeller hub, not shown. The regulator assembly 24 of the propeller is schematically shown in FIG. 1, as well as the stationary accessory plate 29, it being understood that the accessory plate and the stationary adapter assembly connected therewith are attached to the stationary housing of the gear reduction unit 92. The stationary adapter assembly includes a control lever 95, a feathering lever 96 and a speed lever 97. The control lever 95 is shown connected by a link 98 with a bellcrank 99 to a propeller control link 100, the opposite end of which is connected to an output arm 101 of a coordinating control 102. The coordinating control, per se, constitutes no part of this invention, and suffice it to say, that the coordinating control 102 has two input arms 103 and 104, which are connected by links 105 and 106, respectively, to an emergency feathering lever 107 and a cockpit mounted power lever 108. The coordinating control may be of the type shown in McDowall et al. Patent 2,860,712. The coordinating control 102 is also connected by links 109 and 110 to the gas turbine fuel control 111.

The power lever 108 is movable in a quadrant defined by a member 112. The member 112 has a pair of spaced slots 113 and 114 therein connected by a gate 115. The power lever is movable in a clockwise direction, as viewed in FIG. 1, from a full reverse position through a start position, a flight idle position, and a cruise range to a take-off position. Between the full reverse and flight idle position, the pitch position, or blade angle, of the propeller blades is manually scheduled, or selected. Accordingly, this range of power lever movement may be called the "beta" range, one end of the beta range constituting the full reverse position. Between flight idle and the take-off position, the pitch position of the propeller blades is primarily under governor control so as to maintain a substantially constant turbine speed, although a beta follow-up system, to be described hereinafter, is operative in a portion of the cruise range adjacent the take-off position.

The emergency lever 107, when pulled, calls for emergency feathering of the propeller blades through the control link 100, and at the same time, shuts off the fuel to the gas turbine. The emergency feathering arrangement will be described in greater detail hereinafter. Normal propeller feathering may also be effected by moving a switch 116 to call for feathering, the switch 116 completing a circuit through wire 117 to an automatic feathering solenoid 118 attached to the accessory plate and connected by a link 119 with the feathering lever 96. Movement of switch 116 to the feather or the unfeather position also energizes the electric motor driven feathering pump for a timed interval through the slip ring assembly 27. To unfeather the propeller, the switch 116 is moved to the unfeathered position. The switch 116 is spring loaded to the intermediate, or normal, position, by any suitable arrangement, not shown.

As seen in FIG. 1, an alternator 120 is driven from the reduction gear assembly 92 of the propeller assembly shown, which constitutes a "slave" turbine propeller combination. The frequency of the current produced by the alternator 120 is directly proportional to the speed of rotation of the propeller shaft 93, and this speed is compared with the speed signal produced by a "master" turbine propeller driven alternator 121 by an electromechanical speed synchronizer 122, constituting no part of this invention. The speed synchronizer 122 is connected by a wire 123 with a cockpit switch 124 having a center position, a speed synchronize position, and a phase synchronize position. In addition, the speed synchronizer 122 is connected by a wire 125 with an electrical phase synchronizer 126, likewise constituting no part of this invention. The speed synchronizer 122 is connected by a wire 127 to an electric motor 128, which is connected by a linkage 129 with the speed lever 97. The phase synchronizer 126 is connected by a plurality of wires indicated by numeral 130 to the slip ring assembly 27. Either the phase synchronizer 126 or the speed synchronizer 122 may be connected with the slave propeller assembly, but both cannot be connected therewith at the same time.

With particular reference to FIG. 3, the regulator assembly is shown partly in elevation and partly in section, from which it can be seen that the stationary accessory plate 29 carries brush blocks 132 which are electrically connected to the slip ring assembly 27. Each brush block assembly is electrically connected to a cannon type electric outlet plug 133, by which means electrical energy is supplied to the brush blocks and slips rings. A solenoid 134 capable of actuating an axially movable stop member 135 is supported on the accessory plate 29. The stop member 135 cooperates with a stop lug 317 formed on a ring gear 136, FIG. 4, which is connected to rotate upon movement of the control lever 95, as will be pointed out more particularly hereinafter. The solenoid stop prevents inadvertent movement of the control lever 95 and its associated control gear 136 into the beta range of propeller operation. The solenoid stop can be removed by energizing the solenoid by suitable switch means, not shown, in the aircraft cockpit. The feathering lever 96 is connected with a feathering ring gear 137. The feathering lever 96 is biased by suitable spring means, not shown, to a normal position and can be moved to call for propeller feathering either by movement of a link 138, which is connected by means of a bellcrank 139 and a link 140 to a lever 96, or by energization of the automatic feathering solenoid 118, as seen in FIG. 1. The link 138 is mechanically positioned by a negative propeller shaft torque sensing device, not shown, within the gear reduction unit 92. The automatic feathering solenoid 118 can be energized during propeller take-off through wire 141 from a negative propeller shaft thrust sensing device, not shown, within the gear reduction unit 92, neither sensing device constituting a part of this invention.

The speed lever 97 is connected with a ring gear 142, which is located in a plane common to that of ring gear 137. The ring gear 137, being of smaller diameter than ring gear 142, is externally toothed, while the ring gear 142 is internally toothed. The speed lever is shown connected by linkage 129 to a shaft 143 of the electric motor 128, the housing of which is attached to the accessory plate 29. As aforementioned, energization of the motor 128 is controlled by the speed synchronizer 122.

As seen in FIG. 3, the accessory plate 29 is connected by a plurality of bolts 144 to a stationary sleeve 145 of the adapter assembly 28. The stationary sleeve 145 supports bearing means 146 and 147 which journal the regulator housing and cover for rotation about the sleeve 145. In addition, the regulator housing 25 and the cover 26 carry seals 148 and 149, which engage the sleeve 145 so as to prevent the leakage of hydraulic fluid from the reservoir structure.

The pump power gear 38 is shown connected by bolts to the stationary sleeve 145. In addition, three rings are adapted for axial movement on the stationary sleeve 145, namely a feathering ring 150, a control ring 151 and a speed ring 152. The feathering ring engages three high leads screws 153 disposed 120° apart, which high lead screws are driven by pinion gears 154 that mesh with the ring gear 137. Accordingly, upon rotation of the ring gear 137 by means of the feathering lever 96, axial movement will be imparted to the feathering ring 150.

The control ring 151 threadedly engages three high lead screws 155 spaced 120° apart, the high lead screws 155 being attached to pinion gears 156, which mesh with both the ring gear 136 and a synchronizing gear 157. As will be pointed out more particularly hereinafter, rotation is only imparted to the high lead screws 155 throughout a portion of the total movement of the control lever 95 and the ring gear 136 so as to effect axial movement of the control ring 151.

The speed ring 152 is threadedly connected to three high lead screws 158 which are attached to pinions 159 that mesh with the internal ring gear 142 which is attached to the speed lever 97. Accordingly, upon angular movement of the speed lever 97 by the electric motor 128, axial movement will be imparted to the speed ring 152. FIG. 3 also shows a cross-sectional view of the conduit means, or tube insert assembly 160 of the regulator housing 25.

With particular reference to FIG. 6, the propeller hydraulic control system will be described. As aforementioned, four major valve assemblies are mounted on the housing 25 of the regulator. The pumps 36, which are energized incident to propeller rotation, draw fluid from the regulator reservoir and discharge fluid under pressure into a conduit 167. The conduit 167 is connected through a one-way check valve 168 to a high pressure supply conduit 169 constituting part of the tube insert assembly of the regulator housing 25. The conduit 169 is connected to branch conduits 170 and 171. The conduit 170 communicates with a hub passage 172 which connects with the feathering pump reservoir 55, as will be described hereinafter. The conduit 170 communicates with a passage 173 of the feathering valve assembly 31. The feathering valve assembly 31 includes a casing having valve chambers 161, 162, 163 and 164 therein. The passage 173 communicates with valve chamber 163, in which the spool valve 165 having a plurality of spaced lands 174, 175, 176, 177 and 178, is disposed. The spool valve 165 is normally biased to the position shown by a spring 179. In this position, the passage 173 is connected by the annular groove between lands 176 and 177 with a passage 180. The passage 180 has branches communicating with one end and an intermediate portion of the valve chamber 161 within which a minimum pressure valve 166 is disposed. The minimum pressure valve 166 includes spaced lands 181 and 182 and is normally biased by means of a spring 183 to block communication between the passage 180 and a passage 184 when the propeller is stationary. However, when the pressure developed by the feathering pump is greater than the opposing force of the spring 183, or the propeller is rotating, the valve element 166 will move to the position shown so as to interconnect passages 180 and 184. The function of the minimum pressure valve 166 is to prevent the connection of the high pressure conduit 170 with the passage 184 until the pumps 36 produce sufficient flow under pressure to satisfy the requirements of the low pressure servo system to be described.

The conduit 171 communicates with a passage 185 of the governor assembly 30. The governor assembly 30 includes a casing 186 having five valve chambers 187, 188, 189, 190 and 191, all of which extend in substantially a radial direction from the horizontal propeller axis. A pressure reducer valve 192 is disposed within valve chamber 191 of the governor assembly. The pressure reducer valve 192 is of conventional design and is operative to maintain a substantially constant pressure of approximately 400 p.s.i. in conduit 193 and passage 194. During propeller rotation at the selected speed setting of the governor, the output pressure of the pumps 36 may be on the order of 3600 p.s.i. The conduit 193 and the passage 194 supply this low pressure fluid to the low pressure servo system to be described.

The low pressure system is employed to control a mechanical low pitch stop 195, which is set a predetermined amount, for instance, 2°, below the hydraulic low pitch stop for the propeller blades. The low pressure servo system is also used to control a mechanical pitch lock 196, which, when operative, prevents movement of the propeller blades in the decrease pitch direction while permitting movement of the propeller blades in the increase pitch direction. Both the mechanical low pitch stop and the mechanical pitch lock are operatively associated with a master gear 197, which is connected with each of the several blade gears 198 to coordinate their pitch changing movements. Thus, during pitch adjustment of the propeller blades, the master gear 197 rotates about the horizontal propeller axis, and, accordingly, has a predetermined angular position relative to the propeller hub for each pitch position, or angle, of the propeller blades. The mechanical pitch stop and the mechanical pitch lock constitute no part of this invention and may be of the type shown in the aforementioned copending applications Serial Nos. 545,033, now abandoned, and 545,034, now Patent No. 2,957,528.

Operation of the mechanical low pitch stop and the mechanical pitch lock are controlled by the pitch stop and pitch lock valve assembly 33, which includes a housing 199 having valve chambers 200, 201, 202 and 203 therein. The low pressure conduit 193 communicates with a passage 204 in the housing 199.

The low pressure passage 194 in the governor assembly 30 communicates with valve chamber 190 within which a minimum pressure valve 205 is disposed. When the propeller is rotating, or the pressure below the valve 205 is 400 p.s.i., passage 194 is connected with passages 206 and 207. However, when the propeller is stationary and the pressure in passage 194 is substantially below 400 p.s.i., a spring 208 moves the valve element 205 so as to block communication between the passage 194 and the passage 207. Passages 206 and 207 communicate with valve chamber 189 of the governor assembly within which a speed sensitive valve element 209 and a follow-up sleeve 210 are disposed for reciprocable movement. The sleeve 210 is biased upwardly by a spring 211 and is connected by a link 212 having an intermediate pivot with a distributor valve element 213 disposed in the valve chamber 188. The distributor valve element 213 includes spaced lands 214, 215, 216 and 216a, and a differential area piston 217. The upper surface of the differential piston 217, as viewed in the drawing, is of lesser area than the lower surface thereof, the difference in area being due to the diameter of the rod which connects the differential area piston 217 with the valve element proper. The smaller area of the differential area piston 217 is always subjected to the 400 p.s.i. servo pressure through a passage 218 that always communicates with the passage 206. The chamber associated with the larger area of the differential piston 217 is connected to a passage 219 that communicates with ports 220 of the sleeve 210.

The speed sensitive valve element 209 is formed with spaced lands 221 and 222, and the rod thereof is pivotally connected at its lower end to a speed sensitive lever 223 pivoted at 224 to the housing 186 of the governor assembly 30. The intermediate portion of the lever 223 is engaged by a governor spring 225. Since the valve chamber 189 is located in a substantially radial direction from the horizontal propeller axis, during propeller rotation, the valve element 209 will respond to the thrust of centrifugal force, which will tend to move it upwardly, as viewed in FIG. 6. The spring 225 opposes upward movement of the valve element 209, and the load of the spring 225 is initially adjusted so that at a preselected speed of propeller rotation, the opposing forces acting on the valve element 209, namely, centrifugal force and the spring force, will be in equilibrium so that the land 221 will close the ports 220. When the land 221 closes the ports 220, the valve element 209 is in the "On speed" position. Upon an increase in propeller speed above the preselected speed setting, the thrust of centrifugal force will exceed the force of the spring 225 and the valve element 209 will move upwardly, thereby connecting ports 220 to drain. Conversely, upon a decrease in the propeller speed below the preselected speed setting, the force of the spring 225 will exceed that of centrifugal force to move the valve element 209 downwardly, thereby connecting ports 220 with the low pressure passage 206.

The low pressure passage 207 always communicates with a passage 226, which connects with an annular groove between lands 216 and 216a of the distributor valve element 213. In order to maintain the servo actuated distributor valve element 213 sensitive to a change in the pressure of fluid acting on the larger area of differential piston 217, the chamber of the larger area piston surface is connected by a conduit 227 with an hydraulic jitter valve 228 comprising a piston 229 connected to a follower 230, which engages an undulated surface 231 of the pump power gear 38. Thus during propeller rotation, the plunger 230 creates intermittent pressure pulses which serve to impart a slight jitter, or dither, reciprocating movement to the distributor valve element 213.

The high pressure fluid in passage 184 of the feathering valve assembly 31 communicates with a conduit 232 having branch conduits 233 and 234. The branch conduit 233 communicates with a passage 235 in the housing 186 of the governor assembly 30. The passage 235 communicates with valve chamber 188 between the lands 214 and 215 of the distributor valve element 213. In addition, the passage 235 communicates with valve chamber 187 within which a pressure control valve 236 for the high pressure system is disposed. The pressure control valve 236 includes a throttle land 237 which cooperates with a drain passage 238. The pressure control valve 236 is urged downwardly, as viewed in FIG. 6, by the high pressure fluid acting on the upper surface of land 237. In addition, the pressure control valve 236 is urged upwardly by a spring 239, the thrust of centrifugal force and pressure fluid from conduit 240 which communicates with the increase pitch chambers 241 of the torque units, as will be described hereinafter. The pressure control valve 236 maintains a pressure in passage 235, a predetermined potential above that demanded by the increase pitch chambers of the torque units. In other words, the pressure in passage 235 will always be equal to the pressure of fluid in conduit 240 plus the increment of pressure potential equivalent to the force of spring 239 and the thrust of centrifugal force. Any excess in pressure produced by the pump 36 over that maintained in passage 235 and conduits 233 and 234 by the pressure control valve 236 is diverted into the drain passage 238, which communicates with drain conduit 242 connected to branch conduit 243 and a hub passage 244, which communicates through a check valve 245 with the feathering pump reservoir 55. The conduit 242 and the hub passage 244 are always pressurized since the pressure output of the pumps 36 is always in excess of the pressure requirements established by the pressure control valve 236 during propeller rotation at the selected governing speed.

The distributor valve element 213 controls the supply and drain connections of high and low pressure fluid to opposite sides of the propeller torque units at all times except when the feathering valve assembly 31 is actuated. Thus, port 246 associated with the distributor valve is connected to an increase pitch conduit 247, which communicates with a passage 248 of the feathering valve assembly 31. Passage 248 communicates with valve chamber 163 within which the valve element 165 is disposed. When the valve element 165 is in the position shown, the passage 248 is connected with a passage 249 through the annular groove between lands 177 and 178 of the valve 165. Passage 249 is, in turn, connected to a hub passage 250, which communicates with the increase pitch chambers 241 of the torque units.

Port 251 associated with the distributor valve 213 is connected to a conduit 252, which communicates with hub passage 253. The hub passage 253 connects with a transfer tube 254 that extends through the torque unit piston 255 and communicates with the decrease pitch chamber 256 of its respective torque unit. The decrease pitch torque unit chambers 256 are always maintained under a predetermined low pressure, which produces a force on the piston in assisting relation to the centrifugal twisting moment forces effective on the blades 22 during propeller rotation, which combined forces tend to rotate the blades 22 about their longitudinal axes in a decrease pitch direction, as indicated by the arrow in FIG. 6. The predetermined low pressure maintained in the decrease pitch chambers 256 may be on the order of 50 p.s.i. as controlled by a decrease loader valve 257 disposed in valve chamber 164 of the feathering valve assembly 31. The decrease loader valve 257 actually comprises a spring loaded check valve, one surface of which is exposed to the pressure maintained in the drain conduit 242, as communicated thereto through passage 258. When the pressure in the decrease pitch chambers 256 of the torque units is less than 50 p.s.i., which pressure is communicated to the other side of the loader valve 257 through conduit 252 and passage means 259, the decrease loader valve 257 will be actuated to interconnect passages 258 and 259, thereby supplying additional fluid under pressure from the drain conduit 242 to the decrease pitch chambers 256.

In the "On speed" position of the speed sensitive valve 209, the low pressure fluid acting on the upper surface of the differential piston 217 positions the distributor valve element 213 so that the port 246 is slightly open to the high pressure passage 235 and the port 251 is slightly open to drain. Thus, the increase pitch chambers 241 of the torque units are pressurized to exactly balance out the combined forces produced by the centrifugal twisting moments on the blades and the low pressure maintained in the decrease pitch chambers, so that the pitch position of the propeller blades will not change. However, when the speed sensitive element 209 senses an increase in propeller speed above the selected governing speed, the valve element 209 will move upwardly, thereby connecting ports 220 to drain so that the low pressure fluid acting on the upper surface of the differential area piston 217 will move the distributor valve element 213 downwardly, thereby increasing the area of port 251 to the drain passage 238 and increasing the area of port 246 connected to the high pressure passage 235. The distributor valve repositions the sleeve 210 to close ports 220. Accordingly, the increase in pressure in the increase pitch chambers 241 coupled with the connection of the decrease pitch chambers 256 to drain, will cause the blades 22 to rotate in the increase pitch direction so as to increase the load on the turbine and reduce propeller speed to the selected governor speed setting, at which time, the speed sensitive element 209 will move downwardly causing the distributor valve to move upwardly to the "On speed" position and reposition the sleeve 210 to close ports 220.

Conversely, if propeller speed should decrease below the governor speed setting, the valve element 209 will move downwardly so as to connect ports 220 with the pressure passage 206. In this instance, the increase in pressure on the larger area of the differential piston 217 will move the distributor valve element 213 upwardly so as to connect port 246 to the drain passage 238 and open port 251 to low pressure. When the increase pitch chambers 241 are connected to drain, the constant pressure maintained in the decrease pitch chambers 256 plus the force of centrifugal twisting moments will cause the propeller blades 22 to rotate in the decrease pitch direction so as to again restore propeller speed to the governor speed setting. During movements of the distributor valve plunger 213, the sleeve 210 is moved in a follow-up relation relative to the speed sensitive element 209 through the link 212. In addition, in the absence of any pressure fluid on either side of the differential area piston 217, the spring 211 will move the distributor valve element 213 downwardly to interconnect port 246 with the passage 235 and connect port 251 with the drain passage 238. Since in the extreme downward position of the distributor valve 213, the decrease pitch chambers 256 are connected to drain, and the increase pitch chambers 241 are connected to pressure, the blades 22 will move towards the feathered position.

One end of the governor spring 225 is engaged by a movable abutment 260. In addition, the abutment 260 constitutes a piston responsive to pressure fluid in chamber 261 which is connected to conduit 262. In addition, the abutment 260 is engaged by one end of a lever 263 having an intermediate pivotal mounting to the housing 186. The other end of the lever 263 is pivotally connected to one end of a rod 265. The other end of the rod 265 has a cam 266 attached thereto engageable with a follower shoe 267 which is connected for movement with the speed ring 152. The axial position of the speed ring, and, hence, the load on the governor spring 225 of each slave propeller turbine combination can be adjusted by angular movement of the speed lever through ring gear 142, pinion gears 158 and high lead screws 159.

Figure 7:
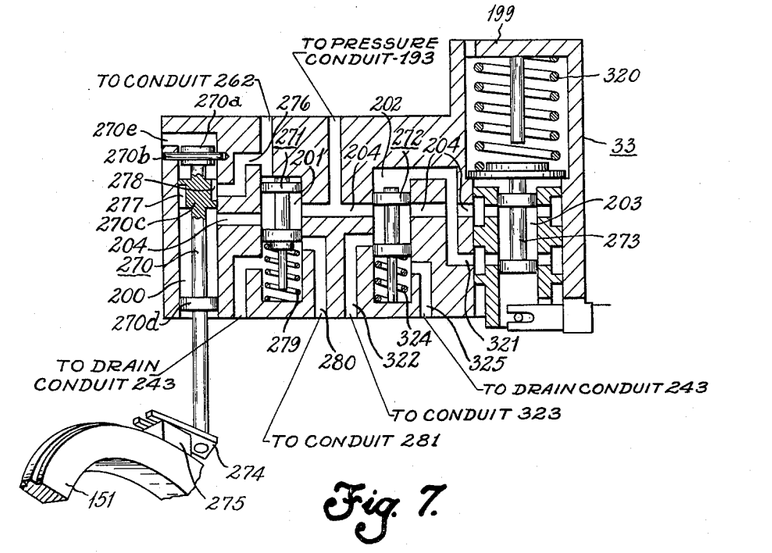
FIGURE 7 is an enlarged sectional view of the pitch stop and pitch lock valve assembly shown in FIGURE 6.

The pitch stop and pitch lock valve assembly 33 includes a rotary selector valve 270, a low pitch stop valve 271, a pitch lock servo valve 272 and a speed sensitive pitch lock control valve 273. The rotary selector valve 270 is connected to a crank arm 274 having a pivotal connection with a shoe 275 that engages the control ring 151. As seen in FIGURE 7, the rotary selector valve 270 comprises a plunger having a head portion 270a which has an annular groove through which a pin 270b extends. The pin 270b is secured to the casing 199 and prevents axial movement of the plunger while permitting rotation thereof. The plunger also includes a porting land 270c and a sealing land 270d. The porting land 270c has a pair of diametrically opposed and oppositely extending peripheral ports 277 and 278. Port 277 is connected through the valve bore 200 with pressure passage 204, and port 278 is connected through the valve bore 200 with a drain passage 270e. When the control ring is moved axially to the left, as viewed in FIG. 7, due to a predetermined counterclockwise movement of the control lever 95, as viewed in FIG. 6, which imparts counterclockwise rotation to the ring gear 136, pinion gears 156 and high lead screws 155, the crank arm 274 will rotate the selector valve 270 to interconnect low pressure passage 204 with passage 276 through port 277. In the position shown in FIG. 7, the selector valve connects passage 276 to drain through port 278.

Passage 278 is connected to conduit 262 and the top of valve chamber 201 within which the servo operable pitch stop control valve 271 is disposed. When low pressure fluid is supplied to conduit 262, the abutment 260 for the governor spring 225 is depressed to increase the governor speed setting a predetermined amount. At the same time, the pitch stop control valve 271 is moved against its spring 279 to interconnect passages 204 and 280 while blocking connection between passage 280 and drain conduit 243. The passage 280 is connected to a conduit 281 which communicates with the mechanical low pitch stop release chamber 282 so as to render the low pitch stop ineffective to prevent movement of the propeller blades below the mechanical low pitch stop angle.

From an inspection of FIG. 6, it can be seen that the lever 223 has a cam surface 285. In addition, the control ring 151 carries a second shoe 286 movable axially therewith. It is specifically pointed out that all of the shoes which engage rings 150, 151 and 152 rotate about their respective rings during propeller rotation, while the axial position of the shoes is determined by the axial position of their respective rings. A lever 287 is pivoted to the shoe 286 at one end, the other end of which is pivoted to a nut 288. A roller type follower 289 is supported on the intermediate portion of the lever 287, the follower 289 being operatively associated with the cam 285 of the speed responsive lever 223. The follower 289 constitutes an override member for the speed sensitive pilot valve 209.

The nut 288 is slidably mounted in the governor assembly housing, as shown in FIG. 6, and threadedly engages a high lead screw 290 which is connected to and rotatable by propeller blade angle feedback means designated by numeral 300. The feedback means may be of the type disclosed in copending application Serial No. 289,110, filed May 21, 1952, in the name of Richard A. Hirsch, now Patent No. 2,761,519, and assigned to the assignee of this invention. Thus, the feedback means are of the intermittent drive type, which only impart rotation to the high lead screw 290 in the beta range of blade angles, for example from a −7° to a +32°. More particularly, the master gear 197 is formed with a partially toothed flange 291 which is engageable with a pinion 292. The pinion 292 is attached to the high lead screw 290 and is formed with a member 293 having a flat 294 thereon. The master gear is also formed with an upstanding flange or cam surface 295 axially spaced from the partially toothed flange 291. The untoothed portion of the flange 291 is coextensive with the cam surface 295 which prevents rotation of the high lead screw 290 when it engages the flat 294 on the member 293. In this instance, the cam surface 295 extends through a range of blade angles from +32° to the full feathered position. Thus, the high lead screw 290 will only be rotated during movement of the propeller blades between −7° and +32°.

When the control ring 151 is moved axially to the left, as viewed in FIG. 6, through movement of the power lever 108 from the slot 114 into the slot 113 below the flight idle position, as viewed in FIG. 1, propeller blade angle or pitch position will be manually scheduled since this constitutes the beta range. Since the load on the governor spring 225 has been increased, thereby increasing the speed setting of the governor, due to actuation of the servo position abutment 260 as controlled by the selector valve 270, the spring 225 will force the cam surface 285 of lever 223 into engagement with the follower 289. The axial position of the follower 289 will determine the amount of downward movement of the speed sensitive element 209. Downward movement of the speed sensitive element 209 will cause the distributor valve element 213 to move upwardly since ports 220 are connected to the pressure passage 206. Upward movement of the distributor valve element 213 will, through link 212, cause a follow-up movement of the sleeve 210 to interrupt the interconnection of passage 206 and ports 220. When the distributor valve element 213 moves upwardly, the increase pitch chambers 241 are connected to the drain passage 238, while the decrease pitch chambers 256 are connected to the low pressure passage 226. Accordingly, propeller blades will move in the decrease pitch direction, and since the propeller blades will be moved into the beta range, the feedback pinion 292 will engage the tooth flange 291 of the master gear so as to impart rotation to the high lead screw 290. When the blade angle position selected by movement of the power lever 108 to a predetermined position in the beta range has been effected by the blades 22, the high lead screw 290 will have imparted movement to the nut 288 so as to reposition the follower 289 and move the speed sensitive valve element 209 upwardly to connect ports 220 to drain. Accordingly, the distributor valve element 213 will move downwardly due to pressure fluid acting on the upper surface of the differential piston area 217, thereby effecting upward movement of the follow-up sleeve 210. When the distributor valve element returns to a position wherein the lands 215 and 216 block ports 246 and 251, respectively, the application of pressure fluid to the decrease pitch chambers of the torque units will be interrupted and the follow-up sleeve 210 will again cause ports 220 to be closed by the land 221. Thus, the pilot can manually select any blade angle between full reverse (for instance, −7°) and flight idle (for instance, +20°) within the beta range, as indicated by the graph in FIG. 12. It is pointed out that in this connection when the pilot moves the power lever 108 into the beta range, the solenoid stop member 135, which is engageable with the control ring gear 136, is removed to permit movement of the control ring gear 136 into the beta range.

Figure 4:
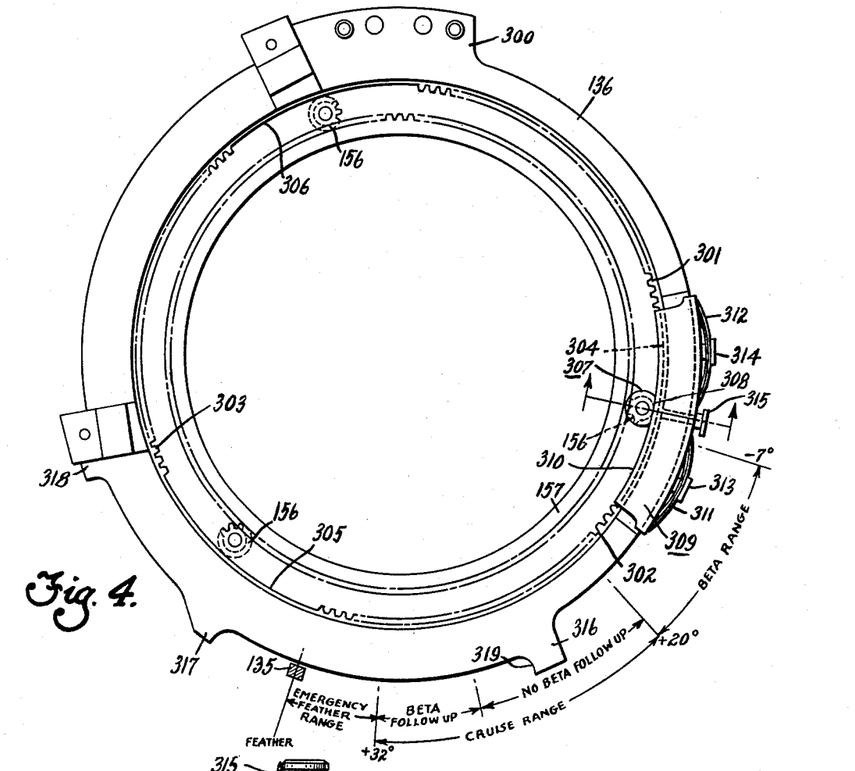
FIGURE 4 is a view, in elevation, of the control ring gear assembly of the regulator assembly.
Figure 5:
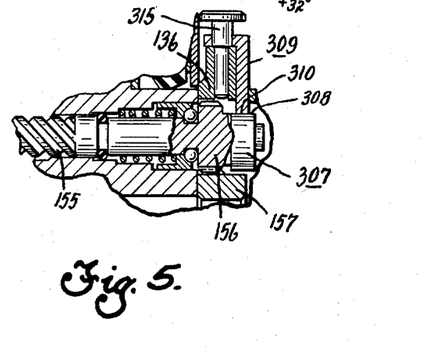
FIGURE 5 is a fragmentary sectional view taken along line 5—5 of FIGURE 4.

With particular reference to FIGS. 4, 5 and 6, it may be seen that the control ring gear 136 includes a flange 300 to which the control lever 95 may be attached. The control ring gear 136 is formed with three internally toothed sections 301, 302 and 303, which are circumferentially spaced by smooth arcuate sections 304, 305 and 306. However, the synchronizing gear 157 is toothed throughout its entire periphery. Moreover, the pinion gears 156 are toothed throughout their peripheries, although one of the pinion gears 156, as shown in FIG. 4, has attached thereto a member 307 with a flat 308 thereon. The member 307 is spaced axially relative to its particular pinion gear 156 and cooperates with a cam flange 309 attached to the control ring gear 136 and having an arcuate surface 310 of angular extent equal with the smooth section 304. The arcuate surface 310 cooperates with the flat 308 on the member 307 to prevent rotation of the pinion gear 156 and the synchronizing gear 167 throughout angular movement of the control ring gear 136 through the angular extent of the flange 309. Thus, during this predetermined angular movement of the control ring gear 136 by the lever 95, rotation will not be imparted to the pinion gears 156 and the high lead screws 155 due to the intermittent drive mechanism aforedescribed. This range corresponds to movement of the power lever 108 in the non-beta follow-up portion of the cruise range.

When the pilot lever 108 is moved into the beta range between full reverse and flight idle, the control ring gear 136 will be rotated in a counterclockwise direction, as viewed in FIG. 4, so that the pinion gear 156, associated with the cam flange 309, will drivingly engage the toothed section 302. Conversely, when the power level 108 is moved in the beta follow-up portion of the cruise range to the take-off position, the pinion gear 156 associated with the cam flange 309 will engage the toothed section 301. Thus, when the power lever 108 is moved towards take-off from an intermediate position in the cruise range or moved between flight idle and reverse, rotation will be imparted to the pinion gears 156 and the high lead screws 155 so as to impart axial movement to the control ring 151. However, during power lever movement within the non-beta follow-up portion of the cruise range, no movement will be imparted to the pinion gears 156 and the high lead screws 155 or the control ring 151 due to the intermittent drive mechanism.

The cam flange 309 is biased by lever spring assemblies 311 and 312 which resiliently urge the cam flange 309 into the path of movement of the member 307. As seen in FIG. 4, the leaf springs 311 and 312 react against studs 313 and 314, respectively, which pass through apertures in the cam flange 309 and are anchored in the ring gear 136. Thus, the leaf spring assemblies 311 and 312 constantly urge the cam flange 309 into engagement with the outer periphery of the ring gear 136. In addition, a third stud 315 extends through an aperture in the cam flange 309 and is anchored to the ring gear 136. The stud 315 pilots the cam flange 309 on the ring gear 136 and prevents relative angular movement therebetween.

The ring gear 136 is also formed with radially extending lugs 316, 317 and 318, which are circumferentially spaced, as seen in FIG. 4. The solenoid stop member 135 is arranged to engage the radially extending lug 317, when the solenoid 134 is deenergized to limit movement of the ring gear 136 throughout the angular distance between lugs 316 and 317 wherein the pitch position of the blades can be controlled between the flight idle position of +20° and full feather. As aforementioned counterclockwise rotation of the ring gear 136 calls for movement of the blades in the decrease pitch direction, whereas clockwise rotation of the ring gear 136 calls for movement of the blades in the increase pitch direction. The position of ring gear 136, as shown in FIG. 4, is within the cruise range of movement of the power lever 108. When the solenoid stop member 135 is removed, the control ring gear 136 can be rotated in a counterclockwise direction past the stop member 135 within the range between the radially extending lugs 317 and 318, which constitutes the beta range between full reverse and flight idle.

The beta range of power lever movement between full reverse and flight idle is indicated by the arcuate distance between the lines so labeled in FIG. 4 with reference to the edge 319 of the lug 316. Similarly, the arcuate distance equivalent to the non-beta follow-up portion of the cruise range of power lever movement is indicated in FIG. 4 as being equal to the arcuate extent of the cam flange 309. Likewise, the arcuate distance of the cruise range adjacent the take-off line in FIG. 4 corresponds to movement of the power lever in the beta follow-up range. The arcuate distance between the take-off line and the feather line in FIG. 4 represents the movement imparted to the control ring gear 136 when the emergency level 107 is pulled.

The novel beta follow-up system, or variable hydraulic low pitch stop, is operative during a portion of the power lever movement in the cruise range, during which movement, the ring gear 136 imparts rotation to the pinion gears 156 and the high lead screws 155 in a clockwise direction so as to move the control ring 151 axially to the right, as viewed in FIG. 6. In so doing, blade angle is manually scheduled by reason of the follower 289 being moved towards the cam surface 285 of the lever 223 just below the pitch position required for normal governing during take-off. In other words, during movement of the power lever 108 within the cruise range towards the take-off position, the flow of fuel to the turbine, as regulated by the fuel control 111, is increased. However, at this time, no movement is imparted to the control ring 151. Accordingly, the governor has control over propeller pitch, and if the governor is operating properly as fuel flow to the turbine is increased, turbine speed will increase and the governor will call for an increase in blade angle in an attempt to maintain turbine speed substantially constant. Thus, during power lever movement within the non-beta follow-up portion of the cruise range, if the governor is operating properly, the propeller blades will be moving in an increase pitch direction from the flight idle angle of +20°. However, the minimum scheduled blade angle in the cruise range is +20°, as seen in FIG. 2.

During power lever movement in the beta follow-up portion of the cruise range to the take-off position, the blade angle is manually scheduled to increase from +20° to +32°, as seen in FIG. 2. The beta follow-up system therefor provides overspeed protection during take-off. In addition, if the turbine driving the engine should fail, or malfunction, during take-off, the pitch position of the blades of that particular propeller will have been increased to +32° so as to appreciably reduce the drag created by a failing turbine. As soon as the aircraft is air-borne and the power lever is returned to the non-beta follow-up portion of the cruise range, the hydraulic low pitch stop position is again reduced to +20°.

The hydraulic low pitch stop, which is operative in the governed speed regime, operates in the following manner. Since, as aforementioned, the feedback mechanism is operative within the ringe of angles from −7° to +32°, when the control ring gear 136 is in the non-beta follow-up portion of the cruise range, the end of the lever 287 attached to the shoe 286 has a predetermined position. The position of this lever end is such that when the blades are at +20°, the rotary feedback shaft 290 will have positioned the nut 288 so that the follower 289 engages the cam surface 285 of the lever 223. When the follower 289 engages the cam surface 285 of the lever 223, it positions the valve element 209 so that the ports 220 are closed by the land 221, thereby cutting off flow to the larger area of the differential piston so that the distributor valve 213 will, in turn, cut off the flow of fluid to the decrease pitch chambers 256 of the torque units. This cut off of flow to the decrease pitch chambers of the torque unit prevents movement of the blades below the hydraulic low pitch stop position of 20°. The mechanical low pitch stop 195 is set to positively prevent movement of the blades below a +18° when the conduit 281 is connected to drain, and, thus, acts as a safety device in the event the hydraulic low pitch stop should fail to operate. When the power lever is moved in the beta follow-up portion of the cruise range to the take-off position, the control ring 151 is moved axially to the right so as to advance the hydraulic low pitch stop so it will become operative to prevent movement of the blades below a +32° at the take-off position.

The speed sensitive pitch lock control valve 273 is responsive to propeller speed and at a predetermined propeller overspeed, for instance, 5% above the governor speed setting, the valve 273 will move against its spring 320 so as to connect passage 321 to drain. During normal propeller operation, the passage 321 is connected to the pressure passage 204 so as to maintain the servo valve 272 in the position shown. When the servo valve 272 is in the position shown, the pressure passage 204 is connected to passage 322, which connects to conduit 323 and the release chamber of the mechanical pitch lock 196. Thus, during normal propeller operation, the pitch lock is disengaged from the master gear 197 so as to permit pitch changing movement in the decrease pitch direction. However, when the speed of the propeller exceeds the predetermined overspeed limit, which is indicative of a propeller failure, or malfunction, the speed sensitive valve 273 will connect the passage 321 to drain, thereby allowing spring 324 to move the servo valve element 272 to interconnect passage 322 with passage 325. Since passage 325 is connected to the drain conduit 243, the pitch lock release chamber will be connected to the drain conduit so that the pitch lock will engage the master gear and positively prevent movement of the propeller blades in the decrease pitch direction.

The solenoid valve assembly 32 comprises a solenoid valve 330, which is reciprocable in a bore 331 located at substantially right angles to a radial line from the propeller axis. Thus, centrifugal force has no effect on the position of the solenoid valve. The solenoid valve 330 has ports 332 and 333 connected to conduits 334 and 335, respectively, which are, in turn, connected, respectively, to the increase pitch chambers 241 and the decrease pitch chambers 256 of the torque units, in parallel with the connections from the distributor valve 213. The port 332 communicates with a pressure compensating valve assembly 336 which, per se, constitutes no part of this invention and is of the type disclosed in copending application Serial No. 259,252, filed November 30, 1951, in the name of Dale W. Miller, now abandoned, and assigned to the assignee of this invention. The solenoid valve element 330 is spring-centered to a position where lands 337 and 338 block ports 332 and 333, respectively. Energization of the solenoid windings 339 and 340 is controlled by the electrical phase synchronizer 126, which is operative to modulate the hydraulic flow to the torque units so as to maintain the blades of the slave turbine-propeller combination in a predetermined phase relationship with the blades of the master turbine-propeller combination.

The feathering valve assembly 31 also includes a feathering control valve element 350, which is disposed for reciprocable movement in valve chamber 162. The feathering control valve element 350 includes a rod 351 and is formed with spaced lands 352 and 353. A branch high pressure passage 354 from passage 173 communicates with the valve chamber 162. In addition, the valve chamber 162 is connected by a passage 355 to the end of the valve chamber 163 within which the servo valve 165 is disposed. The feathering control valve element 350 is biased towards the axis of propeller rotation by a spring 356.

With reference to FIG. 6, the feathering pump reservoir is shown connected by a hub passage 380 with the regulator reservoir. The passage 380 connects with the return tube 381 having an open end at the center-line of the feathering reservoir 55 so as to maintain the feathering reservoir full of hydraulic fluid at all times. As aforementioned, the hydraulic fluid in the reservoir is maintained under a slight pressure, 20 p.s.i., since it only receives flow from the drain hub passage 244 through the check valve 245, which is set to open at 20 p.s.i. The check valve 245 is housed within the check valve assembly 71, which is mounted on the back plate 57, as shown in FIG. 7.

The electric motor driven pump 68 draws fluid from the reservoir 55, when the motor 58 is energized. The motor 58 can be energized through suitable switch means, not shown, by the pilot to adjust the pitch position of the propeller blades when the propeller is not rotating. In addition, the feathering motor 58 is automatically energized, by switch means, not shown, through the slip ring assembly 27 when the feathering solenoid 118 is energized and when the emergency handle 107 is pulled. Under these conditions, the output of the pump 68 will not be connected to the hub passage 172 until the pressure output of the propeller driven pumps 36 is a predetermined amount less than the pressure output of the pump 68. Thus, as seen in FIG. 6, the output of the feathering pump 68 is connected to a conduit 381 formed as an integral part of the back plate 57. The conduit 381 communicates with branch conduits 382 and 383. Conduit 382 communicates with check valve assembly 69 having disposed therein a spring-biased check valve element 384, which is urged to the closed position by a pressure fluid from hub passage 172. When the pressure in conduit 382 is greater than the combined force of the pressure in hub passage means 172 plus the spring-acting on the check valve element 384, the discharge of the pump 68 will be connected through conduits 381 and 382 to the hub passage means 172.

The feathering pump pressure control valve assembly 70 includes a pressure responsive valve element 385, and a spring-biased centrifugally responsive member 386. The member 386 is pivotally connected to one end of a lever 387, the other end of the lever being pivotally connected to the housing of the valve assembly 70. Since the member 386 is located in a radial direction from the axis of propeller rotation, during propeller rotation, centrifugal force plus the force of the spring 388 will move the lever 387 in a clockwise direction, as viewed in FIG. 6.

The pressure responsive valve member 385 includes a rod 389, which engages the lever 387, and, thus, the thrust of centrifugal force on the member 386 and the spring 388 oppose the pressure of fluid in conduit 383 acting on the valve member 385. Thus, the valve member 385 regulates the pressure of pump 68 and limits the maximum output pressure thereof to 3000 p.s.i. when the propeller is rotating. However, as the speed of propeller rotation decreases, the centrifugal force acting on member 386, likewise, decreases so that the pressure output of pump 68 is reduced proportionally as propeller speed reduces. When the propeller is stationary, the maximum pressure output of the pump 68 is determined by the spring 388. As is apparent, the pressure control valve member 385 determines the pressure output of the pump 68 by controlling the size of a drain port 390.

The electric motor driven pump 68 is also energized by suitable switch means, not shown, when it is desired to adjust the pitch position of the propeller blades when the propeller is not rotating, as well as to unfeather the propeller. To unfeather the propeller, the feathering control 116 is moved to the unfeather position and the power lever 108 is placed at the flight idle position. Since the propeller is stationary, the distributor valve is positioned by the speed sensitive valve to call for decreasing movement of the propeller blades. This unfeathering movement of the blades of the propeller can, if the aircraft is in flight, be used to start the turbine, in which case the hydraulic governor will assume control over propeller speed and pitch position.

From the foregoing, it is apparent that the present invention incorporates and combines all of the necessary safety features required for turbine powered aircraft, and, in addition, is specifically designed so as to facilitate maintenance and repair of the propeller assembly.

While the embodiments of the present invention as herein disclosed constitute preferred forms, it is to be understood that other forms might be adopted.

What is claimed is as follows:

1. In a variable pitch propeller having blades rotatable about their longitudinal axes to different pitch positions, the combination including, power means operatively connected to the blades for adjusting the pitch position thereof, governor means operatively connected with the propeller and the power means for actuating said power means to maintain propeller speed substantially constant, override means operatively connected with said blades and with said governor means for preventing said governor means from actuating the power means in a decrease pitch direction when the blades are at a predetermined pitch position, and means operatively connected with said override means for adjusting said override means to vary said predetermined pitch position during constant speed propeller operation.

2. In a variable pitch propeller having blades rotatable about their longitudinal axes to different pitch positions, the combination including, power means operatively connected to the blades for adjusting the pitch position thereof, governor means operatively connected with the propeller and the power means for actuating said power means to maintain propeller speed substantially constant, override means automatically preventing the governor means from actuating the power means to decrease the pitch position of said blades when the blades are at a predetermined pitch position, and manually operable means operatively connected with said override means for adjusting said override means to vary said predetermined pitch position during constant speed propeller operation.

3. In a variable pitch propeller having blades rotatable about their longitudinal axes to different pitch positions, the combination including, servo mechanism operatively connected to said blades for adjusting the pitch position thereof, a source of fluid under pressure, control means interconnecting said source of fluid under pressure and said servo mechanism for controlling the application of pressure fluid to said servo mechanism to adjust the pitch position of said blades for maintaining propeller speed substantially constant, override means operatively connected with the blades so as to be positioned thereby during pitch changing movements thereof within a predetermined range and with said control means for adjusting said control means upon movement of said blades to a predetermined pitch position within said range to interrupt the application of pressure fluid to the servo mechanism and prevent further movement of said blades in a decrease pitch direction, and means operatively connected with said override means for adjusting said override means to vary said predetermined pitch position during constant speed propeller operation.

4. In a variable pitch propeller having blades rotatable about their longitudinal axes to different pitch positions, the combination including, servo mechanism operatively connected to said blades for adjusting the pitch position thereof, a source of fluid under pressure, control means interconnecting said source of fluid under pressure and said servo mechanism for controlling the application of pressure fluid to said servo mechanism to adjust the pitch position of said blades for maintaining propeller speed substantially constant, means operatively connected with the blades so as to be positioned thereby during pitch changing movements thereof within a predetermined range, an over-ride member operatively connected with and positioned by said last recited means and also operatively connected with said control means for actuating said control means to interrupt the application of pressure fluid to said servo mechanism when the blades are at a predetermined low pitch position so as to prevent further movement of said blades in a decrease pitch direction, and manually operable means operatively connected with said override member for adjusting the position thereof relative to the said last recited means to vary said predetermined low pitch position during constant speed propeller operation.

5. In a variable pitch propeller having several regimes of propeller operation including, constant speed operation, operation at manually selected pitch angles and reverse operation, the combination including, fluid pressure operated means for varying propeller pitch, a source of fluid under pressure, valve means operatively connected with said source and operable to control the pitch varying means in all of said regimes of operation, an override member engageable with said valve means for automatically disabling said valve means to prevent propeller pitch adjustment in the decrease pitch direction below a predetermined propeller pitch during constant speed propeller operation, and manually operable means operatively connected with said valve means for controlling said propeller in all of said regimes of operation, said last recited means being operatively connected with said override member to adjust the position thereof and manually schedule a pitch position slightly below that required for normal governing during a portion of the movement of said manually operable means during constant speed operation.

6. In a variable pitch propeller having several regimes of propeller operation including, constant speed operation, operation at manually selected pitch angles, reverse operation and feathering operation, the combination including, fluid pressure operated means for varying propeller pitch, a source of fluid under pressure, valve means operatively connected with said source and operable to control the pitch varying means in all of said regimes of operation, an override member engageable with said valve means for automatically disabling said valve means to prevent propeller pitch adjustment in the decrease pitch direction below a predetermined propeller pitch during constant speed operation, a manually operable lever for controlling propeller operation in the regimes of constant speed, manually selected pitch angles and reverse operation, and another manually operable member for selecting feathering operation of said propeller, said lever being operatively connected with said override member, the operative connection therebetween including intermittent drive mechanism for manually scheduling a pitch position slightly below that required for normal governing throughout a portion of its movement during constant speed operation.

7. In a variable pitch propeller having blades rotatable about their longitudinal axes to different pitch positions, the combination including, servo mechanism operatively connected to said blades for adjusting the pitch position thereof, a source of fluid under pressure, control means interconnecting said source of fluid under pressure and said servo mechanism for controlling the application of pressure fluid to said servo mechanism to adjust the pitch position of said blades for maintaining propeller speed substantially constant, feedback means operatively connected with the blades so as to be positioned thereby during pitch changing movements thereof from a full reverse position to an intermediate positive pitch position, override means operatively connecting said feedback means with said control means for actuating said control means upon movement of the blades to said intermediate pitch position so as to interrupt the application of pressure fluid to the servo mechanism and prevent further movement of the blades in a decrease pitch direction, and means operatively connected with said override means to vary said intermediate pitch position during constant speed propeller operation.

8. The combination set forth in claim 7 wherein said control means comprises a governor operated valve which is positioned in accordance with the speed of rotation of the propeller, and a servo actuated distributor valve operatively connected with said governor operated valve for controlling the application of pressure fluid from said source of fluid under pressure to said servo mechanism for adjusting the pitch position of the propeller blades.

9. The combination set forth in claim 8 wherein said governor operated valve is rotatable with said propeller and includes a valve element responsive to the thrust of centrifugal force, a lever pivotally connected to one end of said valve element and a spring engaging said lever and opposing movement of said valve element and lever due to the thrust of centrifugal force, said lever having a cam surface thereon, and wherein said override means interconnecting said feedback means and the control means includes a follower engageable with said cam surface for overriding control of the position of said valve element by the opposing centrifugal and spring forces.

10. In a variable pitch propeller having several regimes of propeller operation including, constant speed operation and operation at manually selected pitch angles, the combination including, power means for varying the pitch position of said propeller, control means operatively connected with said power means for controlling the actuation thereof, means operatively connected with said propeller so as to be positioned thereby during variation of propeller pitch, an override member operatively connected with and positioned by said last recited means and operatively connected with said control means for actuating said control means to interrupt actuation of said power means at manually selected pitch positions, and manually operable means having an intermittent driving connection with said override member for adjusting the position of said override member to vary the pitch position of said propeller at which said actuation is interrupted, said intermittent driving connection including a driving member, a driven member, means affording transmission of movement therebetween during operation in the manually selected pitch angle regime, and means including a lost motion mechanism between the driving and driven members precluding transmission of movement therebetween during operation in the constant speed regime.

11. A rotatable regulator structure for a variable pitch propeller including, a housing and cover assembly rotatable with the propeller, a stationary sleeve extending into said assembly and about which said assembly rotates, a plurality of valve assemblies attached to and rotatable with said assembly, at least one of said valve assemblies controlling propeller pitch in the regimes of constant speed and manually selected blade angles, a nonrotatable but axially movable control ring mounted on said stationary member, means operatively connecting said control ring with said one valve assembly to select constant speed operation, or any angle in the manually selected blade angle regime of operation, manually operable means disposed without said regulator structure, an intermittent drive mechanism operatively interconnecting said manually operable means and said control ring including a driving member, a driven member, means affording transmission of movement therebetween during propeller operation in the regime of manually selected blade angles, and means including a lost motion mechanism between the driving and driven members precluding transmission movement therebetween during operation in the constant speed regime.

References Cited in the file of this patent
UNITED STATES PATENTS

| | | |
|---|---|---|
| 2,678,103 | Martin | May 11, 1954 |
| 2,745,500 | Moore | May 15, 1956 |
| 2,761,519 | Hirsch | Sept. 4, 1956 |
| 2,798,563 | Miller | July 9, 1957 |